United States Patent [19]

Linsenmayer

[11] Patent Number: 4,860,216
[45] Date of Patent: Aug. 22, 1989

[54] COMMUNICATION ADAPTIVE MULTI-SENSOR SYSTEM

[75] Inventor: Glenn R. Linsenmayer, Reston, Va.

[73] Assignee: The United States of America as represented by the Secretary of the Air Force, Washington, D.C.

[21] Appl. No.: 930,161

[22] Filed: Nov. 13, 1986

[51] Int. Cl.⁴ .................... G06F 15/36; G06F 11/18
[52] U.S. Cl. ........................................ 364/516; 371/36
[58] Field of Search ................ 364/516, 517; 371/36; 342/110, 111, 192, 194, 195

[56] References Cited

U.S. PATENT DOCUMENTS

| | | | |
|---|---|---|---|
| 3,913,099 | 10/1975 | Wehner et al. | 342/192 |
| 3,936,826 | 2/1976 | Hoffman | 364/580 |
| 4,025,920 | 5/1977 | Reitboeck et al. | 342/13 |
| 4,225,961 | 9/1980 | Raggenbass et al. | 371/36 |
| 4,241,350 | 12/1980 | Uffelman | 342/192 |
| 4,389,647 | 6/1983 | Fanuele et al. | 342/192 |
| 4,400,700 | 8/1983 | Rittenbach | 342/100 |
| 4,466,067 | 8/1984 | Fontana | 364/516 X |
| 4,633,261 | 12/1986 | Kosaka et al. | 364/517 X |
| 4,649,395 | 3/1987 | Gellekink et al. | 342/194 X |

OTHER PUBLICATIONS

Swartzlander et al., Digital Beam Forming Processor, Proc. Society of Photo Optic Instrumentation Eng., SPIE, vol. 241, 1980, pp. 232-237.

Linsenmayer: Multi-Sensor Target Identification Techniques Procedings of the Sixth Tri-Service NCTR Techniques Conference, Oct. 1979.

Primary Examiner—Felix D. Gruber
Attorney, Agent, or Firm—William G. Auton; Donald J. Singer

[57] ABSTRACT

A multi-sensor system adaptively utilizes communications or data bus facilities for multi-sensor signal fusion. For each source of sensor signals, a local signal processor compares each signal against a pre-determined set of hypotheses, and generates a ranking value corresponding to each hypothesis. An adaptive interface unit then selects the highest ranking values and transmits them, together with an identification of the hypothesis to which they correspond, through the multi-sensor system communication network or data bus, to the system signal processor. The system signal processor then multiplies the ranking from the various sensors, or adds their logarithms and selects the hypothesis whose product (or logarithmic sum) is greatest. This provides for transmission of the highest ranking hypothesis, or of a selection of hypotheses, to identify the target detected by multiple snsors.

1 Claim, 2 Drawing Sheets

COMMUNICATION ADAPTIVE MULTI-SENSOR SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to detection systems which combine signals from several sensors, and more specifically to an integrated multi-sensor system which provides the detection, location and identification of targets by comparing data from several sensor subsystems.

In recent years, interest has increased in developing "integrated" or "fused" sensor systems. Integrated sensor systems are systems consisting of multiple sensors of the same or differing types whose outputs are integrated or fused to provide an estimate of the total environment sensed by the sensors.

Single sensor systems, such as radar tracking systems, commonly compare target echo return signals received with a pre-determined expected set of hypothetical signal parameters to generate a ranking value of the identity to the target. For example, satellites present different target cross-sections and trajectories than those of re-entry vehicles. Therefore, since certain targets produce return signals with expected characteristics, a routine practice of single sensor radar systems includes assigning identifies and probabilities to actual target echo return signals.

It is generally believed that the combination of signals and/or data from several sensors ("fused", or "integrated" sensor systems) will provide better estimates of the environments sensed by these sensors than those provided by any individual sensor. The task of providing such a multi-sensor system is alleviated, to some degree, by the following U.S. patents, which are incorporated herein by reference:

U.S. Pat. No. 4,025,920 issued to H. Reitboech et al;
U.S. Pat. No. 3,913,099 issued to D. Wehner et al;
U.S. Pat. No. 3,936,826 issued to J. Hoffman;
U.S. Pat. No. 4,400,700 issued to O. Rittenbach;
U.S. Pat. No. 4,389,647 issued to M. Fanuele et al; and
U.S. Pat. No. 4,241,350 issued to M. Uffelman.

U.S. Pat. No. 4,025,920 discloses a radar identification system for identifying radar signals from selected parameters so that countermeasures may be initiated. The signals are evaluated by a matrix which includes a pattern of adaptive memory elements. U.S. Pat. No. 3,913,009 discloses an automatic digitally controlled apparatus for improving target recognition. U.S. Pat. No. 3,936,826 discloses a detection system for evaluating received parameters from an object in which the parameters are measured and compared with standard parameters.

The Rittenbach, Uffelman, and Fanuele et al references each disclose target recognition systems with multiple processing channels. While each of the references cited above are satisfactory as single sensor systems, there remains the need for a multi-sensor system which derives target information from the signals of a plurality of sensors. The present invention is intended to satisfy that need.

SUMMARY OF THE INVENTION

The present invention includes a multi-sensor system which uses communications or data bus facilities for transmission of the highest ranking hypothesis to a processor. For each source of sensor signals, a local signal processor compares such signal against a pre-determined set of hypotheses, and generates a ranking value corresponding to each hypothesis. An adaptive interface unit then selects the highest ranking values and transmits them, together with an identification of the hypotheses to which they correspond, through the multi-sensor system communication network or data bus, to the system signal processor. The system signal processor then multiplies the ranking from the various sensors, or adds their logarithms, and selects the hypothesis whose product (or logarithmic sum) is greatest. Each particular sensor transmits as much data as possible over the communications network; the relative amounts of data transmitted by each sensor being controlled by the network communication adaptive controller based upon the needs of the system signal processor.

It is an object of the present invention to use data from multiple sensor systems to generate identifies of detected targets.

It is another object of the present invention to calculate a likelihood of the hypothesis of the target's identity using data from multiple sensor systems.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a multi-sensor system which adaptively uses communications and data bus facilities to provide for the transmission of a highest ranking hypothesis of the identify of a target detected by the multiple sensors.

Figure 1:
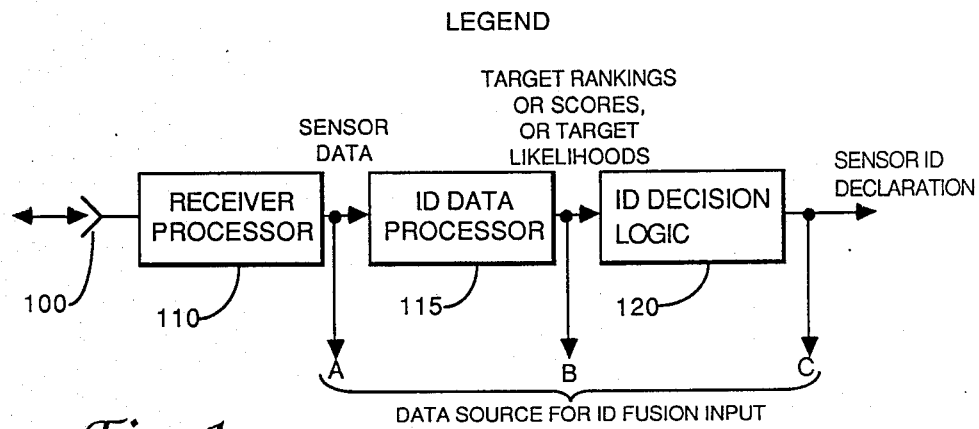
FIG. 1 is a block diagram of a single sensor receiver system.

The reader's attention is now directed towards FIGS. 1, which is a block diagram of a typical sensor receiver subsystem, consisting of a receiver 100, signal processor 110, and decision logic 120. Such a subsystem could, for example, represent the receiver subsystem of an active radar. Note that the receiver of an active radar system is just an example of a sensor that might be used. In fact, any of the radar receiver applications known in the art may serve as a sensor. The receiver could be a part of a passive or bistatic radar system as well as a monostatic radar system. The point is that receiver receives target echo return signals which are radio frequency signals that are reflected off a target. Therefore, for the purpose of this invention, the term "target echo return signals" is defined to include these signals from a target that includes the target related signals that are a product of both a monostatic and bistatic radar system. The decision of logic 120 may be designed to make decisions at various levels, such as detection, location, recognition, or identification.

The received signal is typically first processed to demodulate, decode, and transform the signal to a form suitable for target detection and/or identification processing. This signal (point A) is then compared or matched to a number of hypotheses to be tested, and an output is calculated for each hypothesis (point B) which represents the relative "likelihood" of that hypothesis, or which represents some other "ranking" of the acceptability of that hypothesis. Finally, based upon the data of point B, possibly in a sequential manner, decisions are made to select which hypotheses are accepted.

In a "fused" or "integrated" multi-sensor system, data from several sensor subsystems could be collected at points such as A (e.g., a digitized received signal or spectrum), B (e.g., target class "likelihoods" or "rankings"), or C (e.g., target detection, or ID declaration).

If information is collected from points B depicted in the system of FIG. 1, an opportunity exits to consider a tradeoff between the amount of information collected and transmitted as input to a "signal fusion" subsystem, and the performance of the signal fusion process. As an illustration, suppose for sensor i, only the $m_i$ "most likely" or "highest rank" outputs at point B are selected. As $m_i$ increases, the probability increases that the sensor fusion process will make a correct decision, but the communications capacity required to transmit the data also increase, and conversely.

The system of FIG. 1 is labeled "Prior Art" because it depicts targets and produces identifications with probability rankings for each target. These systems are used with the present invention. For a detailed review of multi-sensor fusion decision logic used in such systems see an article by Mr. Glenn R. Linsenmayer entitled "Multi-Sensor Target Identification Techniques" which was printed in the Proceedings of the Sixth Tri-Service NCTR Techniques Conference in October 1979, the disclosure of which is incorporated by reference. A brief summary of the detection and identification principles involved in that article is presented below along with actual examples of systems which use those principles.

Currently, there exists a number of radar sensor system which routinely perform target identification with probability rankings such as: PAVE PAWS, COBRA DANE, and COBRA JUDY phased array warning systems, which were produced by the Raytheon Company of Wayland, Mass., and which are currently operated by the U.S. Air Force. All of the radar systems mentioned above detect Soviet sea-launched ballistic missiles and intercontinental ballistic missile objects that can include: chaff, re-entry vehicles (RV's), missile structural fragments, missile fuel tanks, as well as orbiting satellites. Any target that is detected is evaluated to see if its fits in each of the five categories of objects. Many targets can be distinguished by either the radar cross sections they exhibit, or their trajectories they are following. However, a number of targets can possess characteristics that fit more than one category. For example, a missile structural fragment can possess approximately the same trajectory and have the radar cross section as an actual RV. For this reason, each sensor system provides a probability ranking for each target it detects and forwards this information to the NORAD Cheyenne Mountain Complex. It is at this central location that an actual determination is made as to the actual identity of the target using multiple sensor inputs. It is also at this central location that the present invention would be useful to correlate the multiple sensor inputs and identify the target. However, before describing the present invention, a review of the principles of target identification with probability rankings is discussed below.

Probability is a measure of the likelihood of occurrence of an event. Consider a particular experiment in which there are n different possible outcomes, all of which are equally likely. If the event E occurs m times out of a possible total of n, the probability of the event E is the ratio m/n. For example, the probability of drawing the ace of spades from a deck of 52 cards is 1/52, the probability of drawing any ace is 4/52=1/13, and the probability of drawing any spade is 13/52=1/4. The scale of probability ranges from 0 to 1. An event which is certain is assigned the probability 1. An impossible event is assigned the probability 0. The intermediate probabilities are assigned so that the more likely an event, the greater is its probability.

One of the more useful concepts of probability theory needed to analyze the detection of signals in noise is the probability-density function. Consider the variable x as representing a typical measured value of a random process such as a noise voltage or current. Imagine each x to define a point on a straight line corresponding to the distance from a fixed reference point. The distance of x from the reference point might represent the value of the noise current or the noise voltage. Divide the line into small equal segments of length x and count the number of times that x falls in each interval. The probability-density function p(x) is then defined as $$p(x) = \lim_{\substack{\Delta x \to 0 \\ N \to \infty}} \frac{(\text{number of values in range } \Delta x \text{ at } x)\Delta x}{\text{total number of values} = N}$$

The probability that a particular measured value lies within the infinitesimal width dx centered at x is simply p(x)dx. The probability that the value of x lies within the finite range from $x_1$ to $x_2$ is found by integrating p(x) over the range of interest, or:

$$\text{Probability } (x_1 < x < x_2) = \int_{x_1}^{x_2} p(x)dx$$

The above-cited Linsenmayer reference describes multi-sensor target identification techniques in detail, and provides the mathematical bases for assigning probability rankings for identified targets of radar sensor system. As noted by the author, the local signal processors of the radar sensor systems use an ID processing algorithm to produce a ranking or target score among the various identifications possibilities. For example, any target detected by the radar system mentioned above would have a set of probability values assigned to each of the five categories of target possibilities. Each probability value would range between 0 and 1, and the mathematical sum of the probability values in each set would equal a total of 1. All of these radar sensors have their own internal correlation schemes which assign these probability values to the identification categories by comparing the actual characteristics of the radar return signals with a set of expected characteristics indicative of each category of target. These identification techniques vary with each sensor, and are generally taken from the fields of statistical decision theory, pattern recognition, or are developed heuristically. A summary of these techniques are described in the following paragraphs.

The three techniques from the field of statistical communications (or statistical decision) theory are all closely related in that they all make use of the calculation of "likelihood". That is, let $\vec{x}$ be a vector of received data and let a set of possible target types be given by $l = (i : i = 1, 2 \ldots, I.)$ Then the likelihood of $\vec{x}$ given i is the conditional probability density $p\,(\vec{x}/i)$. Thus, given $\vec{x}$, and $j^*$ for which $p\,(\vec{x}/J)$ is greater may be considered to be the "most likely" target, and an ID declaration that the unknown target is $j^*$ is a maximum likelihood decision.

The technique of maximum a posteriori probability makes the ID declaration $j^*$ for which the "a posteriori probability is greatest. The a posterior probability of a target is the probability that the unknown target is i, given the received data $\vec{x}$. In order for such a concept to make sense, we must consider an ensemble of possible ID encounters. For each encounter, the unknown target may be any 1.i. The probability that any such target i occurs as the unknown is the "a priori" probability $P_i$ and is assumed known. $\Sigma 1\ P_i = 1$. For such an ensemble of encounters, Bayes rule of probabilities gives the relation:

$$P(i/\vec{x}) = \frac{p(\vec{x}|i)P_i}{p(\vec{x})} \quad (3)$$

where $P(i/x)$ is the posteriori probability of i and $p(x) = \Sigma i\ p(\vec{x}/i)P_i$ is the unconditional probability of the observation data $\vec{x}$. The maximum a posteriori probability ID declaration $j^*$ for which $P\,(j/\vec{x})$ is maximum. Note that for any given $\vec{x}$, $p(\vec{x})$ is constant independent of any particular target, and thus maximizing $P(i/\vec{x})$ is equivalent to maximizing $p(\vec{x}/i)P_i$.

A more general approach is to consider the "expected risk" of an ensemble of encounters. Let $r_{ij}$ be a "risk" or "cost" associated with a declaration j when the target in a particular encounter is actually target i. If $j = i$, the declaration is correct.

The "Conditional Expected Risk" of An ID Declaration "Target;" is:

$$R_1 = \Sigma r_{ij}P(i/\vec{x}) \quad (4)$$
$$= \Sigma r_{ij} \cdot \frac{P(\vec{x}/i)P_i}{P(\vec{x})}$$

(BAYES' RULE)

For equally likely a piori probabilities, the maximum a posteriori probability technique reduces a maximum likelihood technique may be viewed as a maximum a posteriori decision where all targets are assumed to priori equally likely.

In many cases, $\vec{x}$ may be regarded as $$\vec{x} = \vec{t_i}\vec{n} \quad (5)$$

where $\vec{t_i}$ is a "prototype" for target i and $\vec{n}$ is white Gaussian noise. In that case, the likelihood calculations reduce to correlations between $\vec{x}$ and the prototypes, $\vec{t_j}$. As an example of this, assume $\vec{x} = \vec{t} + \vec{n}$, I.E., the data is "PROTOTYPE" plus white noise.

Then the likelihood is:

$$P(\vec{x}/i) = \left(\frac{1}{\sigma\sqrt{2\pi}}\right)^m e \cdot \left(\frac{1}{2\sigma^2}\right) \sum_{k=1}^{m} (x_k \cdot t_{ik})^2 \quad (6)$$

Once the local processor of the sensor system assigns probability values to the possible identification categories, they are ranked by sorting them in the order of highest probability. This is performed by the conventional logical sort mentioned in the above-cited Linsenmeyer reference.

Figure 2:
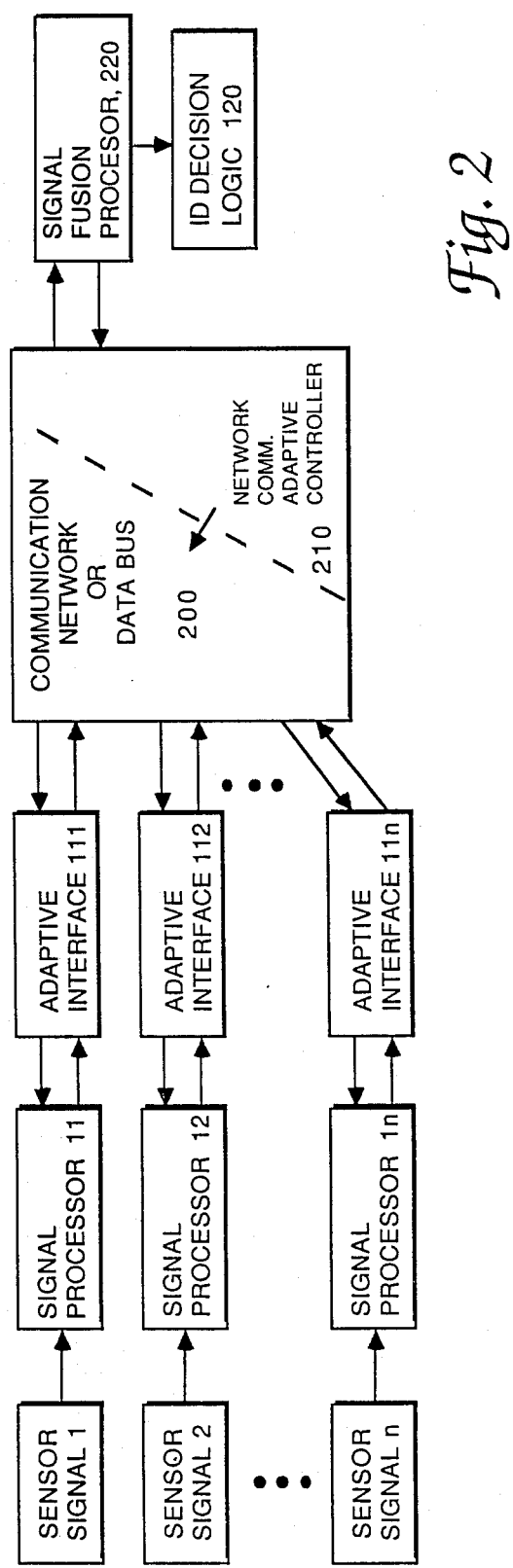
FIG. 2 is a block diagram of the communications adaptive multi-sensor system of the present invention.

FIG. 2 is a block diagram of the communications adaptive multi-sensor system of the present invention. For each source of sensor signal i, a local "signal processor" (11–1n) compares each receive signal from n sensors against a pre-determined set of hypotheses, and generates a ranking value. For example, fusion can be accomplished using correlation or matched filter processing, or otherwise calculating "likelihood" values corresponding to each hypothesis. Each of the "adaptive interface" units (111–11n) then selects the $m_i$ highest ranking values and transmits them, together with an identification of the hypothesis to which they correspond, through the multi-sensor system communication network or data bus 100, to the system signal fusion processor 220. The signal fusion processor 220 then multiplies the rankings from the various sensors, or adds their logarithms, and selects the hypothesis whose product 9or logarithmic sum) is greatest.

The number of highest ranking values $m_i$ transmitted by sensor i (where i is an integer from 1 to n) depends upon the rate of signal inputs to the sensor and upon the allowed communications capacity to be utilized by that sensor. These allowed communications capacities are determined for each sensor by the network communications adaptive controller, and transmitted over the network communications links or data bus to the adaptive interfaces. Thus, each particular sensor transmits as much data as possible over the communication network; the relative amounts of data transmitted by each sensor being controllable by the network communication adaptive controller based upon the needs of the signal fusion processor 220. The output from signal fusion processor 220 is applied to ID decision logic 120.

Figure 3:
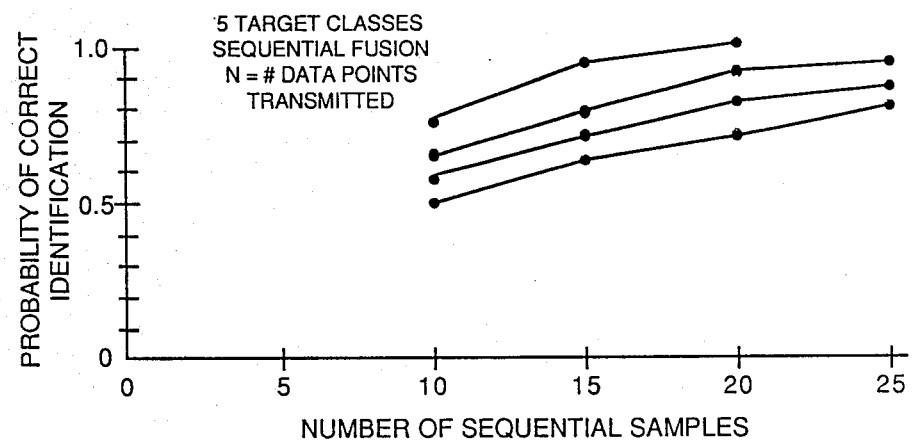
FIG. 3 is a chart comparing signal fusion vs. data transmission amount in an example of the operation of the present invention.

FIG. 3 is a chart which illustrates a set of simulated results which compare, for a particular two sensor example, the performance tradeoff which exists between "ID-fusion" performed and communications. For this example, 5 target classes were assumed. The example indicates in general that more data transmitted to the signal fusion processor results in better ID fusion performance. Thus, the communications adaptive multi-sensor system described here may be expected to provide best signal fusion system performance for any particular communications capacity available to the system. In the presence of periods of input overload or communications degradation, the communications-adaptive multi-sensor system will accomplish this by transmitting the highest ranking hypotheses only, up to the communications capacity available.

As a variation to the procedure of transmitting the $m_i$ "highest ranking" or "most likely" hypothesis, the signal fusion processor could generate "requests" for data (e.g., lists of hypotheses to be tested), directed to particular sensors. The network communications adaptive controller would then direct these particular sensors to transmit data for all or for the $m_i$ most likely or highest ranking hypothesis among those requested.

Any variable-message-length communication network or data bus protocol would be suitable to provide the data transmission function of the communications-adaptive multi-sensor system. The logical message format for sensor i, transmitting data associated with $m_i$ hypotheses, would include a message length field, followed by $m_i$ data blocks. Each such data block would describe one of the $m_i$ hypotheses. Data included in the data block would include a hypothesis description code, and its associated hypothesis value or rank.

The signal fusion processor may implement types of fusion decision logic other than the largest product or logarithmic sum. Examples include the use of thresholds, sequential logic, etc. Such variation are included within the scope of the present invention. For a detailed review of multi-sensor fusion decision logic, see an article by Mr. Glenn R. Linsenmayer entitled "Multi-Sensor Target Identification Techniques" which was printed in the Proceedings of the Sixth Tri-Service NCTR Techniques Conference in October 1979, the disclosure of which is incorporated by reference.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In a multi-sensor system which has a plurality of sensors which receive target echo return signals from a tracked target, and a plurality of local signal processors, each being electrically connected to, and receiving said target echo return signals from one of said sensor systems and producing a plurality of hypothesis identifications with probability rankings of said hypothesis identifications for said target by comparing said target echo return signals with expected characteristics of target identifies, wherein the improvement comprises:

a signal fusion processor which is programmed to produce a highest ranking hypothesis identification by composing probability sums for each hypothesis identification by adding logarithms of probability rankings of like hypothesis identifications from each of the local signal processors to create a set of probability sums, with one probability sum for each hypothesis identification, and outputting the hypothesis identification with the highest probability sum as the highest ranking hypothesis identification; and a means for identifying said tracked target, said identifying means identifying said tracked target as having the hypothesis identification with the highest probability sum produced by said signal fusion processor.

* * * * *